United States Patent [19]

Seibold et al.

[11] Patent Number: 4,720,700

[45] Date of Patent: Jan. 19, 1988

[54] SECURITY SYSTEM AND METHOD FOR ELECTRONIC APPARATUS, PARTICULARLY CAR RADIOS OR SIMILAR AUTOMOTIVE AUDIO EQUIPMENT

[75] Inventors: Peter Seibold, Diekholzen; Karl-Peter Strauss, Hildesheim, both of Fed. Rep. of Germany

[73] Assignee: Blaupunkt-Werke GmbH, Hildesheim, Fed. Rep. of Germany

[21] Appl. No.: 820,674

[22] Filed: Jan. 21, 1986

[30] Foreign Application Priority Data

Mar. 16, 1985 [DE] Fed. Rep. of Germany ....... 3509562

[51] Int. Cl.$^4$ ............................................. G08B 13/14
[52] U.S. Cl. .................................... 340/568; 340/63; 340/691; 340/825.31; 340/825.32
[58] Field of Search ................. 340/568, 540, 63, 691, 340/825.31, 825.32

[56] References Cited

U.S. PATENT DOCUMENTS

| | | | |
|---|---|---|---|
| 4,103,289 | 7/1978 | Kolber | 340/568 |
| 4,246,573 | 1/1981 | Kiss | 340/568 |
| 4,604,708 | 8/1986 | Lewis | 340/825.31 |
| 4,679,026 | 7/1987 | Knakowski et al. | 340/568 |
| 4,683,462 | 7/1987 | Takeda et al. | 340/825.32 |

OTHER PUBLICATIONS

Operating instructions, Nakamichi (Japan) Car Radio Model No. TD-1200, p. 2.

Primary Examiner—Glen R. Swann, III
Attorney, Agent, or Firm—Frishauf, Holtz, Goodman, Woodward

[57] ABSTRACT

Upon unauthorized removal of a car radio (2) from the chassis (C) of a car, a memory (5) which has a code stored therein is changed and inhibits operation of the car radio. The memory is retained in a predetermined memory state either by continuously receiving data inputs, for example from a potentiometer slider of a potentiometer (6), or data entered into an RAM energized only upon being properly connected in the vehicle. Alternatively, a user may enter a code, for example by operation of station selector buttons (4) of the car radio (2), and upon operating a set code switch (9), which code is destroyed upon removal of the radio, or upon failure to enter the correct code from time to time. The selected code can be encrypted by a preset encrypting memory chip, for example within the memory (5), and the encrypted code displayed, with only the manufacturer knowing the encrypting data, and releasing the encrypting data only to an authorized person, thereby permitting continued use of the radio by the authorized person even though the code word may have been forgotten.

23 Claims, 2 Drawing Figures

SECURITY SYSTEM AND METHOD FOR ELECTRONIC APPARATUS, PARTICULARLY CAR RADIOS OR SIMILAR AUTOMOTIVE AUDIO EQUIPMENT

The present invention relates to a security system and method for electronic apparatus installed in a housing or on a support, and more particularly to automotive audio systems, usually referred to as "car radios" installed in a car.

BACKGROUND

Car radios—and this term will be used although the radios may include, typically, cassette recorders and other electronic accessory equipment—installed in automobiles have a high value with respect to their weight and size and, consequently, are subject to theft. Car radios frequently are stolen from parked cars; breaking into a car is a simple matter for a professional thief, and, since the car radios are small, they can be stolen and easily hidden.

It has previously been proposed to reduce such thefts by providing for mechanical locks for the car radios to prevent their unauthorized removal without a key, by coupling car radios to otherwise already present automotive alarm systems so that removal of the car radio will trigger an alarm; the effectiveness of all such arrangements, however, is limited.

THE INVENTION

It is an object to so modify a car radio that, unless removed by an authorized person, it cannot be used or played or re-used; thus, the value of the stolen item becomes zero if the radio is made inherently inoperative after theft.

Briefly, a non-volatile memory, such as an EAROM (Electronically Alterable Read-Only Memory) is incorporated in a car radio into which a predetermined code word, personal to the owner, can be entered and stored. Entering means, to enter the code word, may be coupled to the radio, for example by use of station selector buttons or the like. A removal sensing means is provided, which provides an "apparatus present" code or signal but which, upon removal of the car radio from the vehicle, electrically either inhibits entry of a code word to the EAROM or, otherwise, provides electrical signals which will not result in an authorized user identification. A comparator forming, for example, part of a microprocessor already present in the car radio can be used to determine concurrence. The microprocessor then will not control operation of the radio, e.g. tuning, tape transport, etc. Unless the proper code word is entered, the radio is rendered inoperative.

Rendering a radio inoperative can be accomplished simply by, for example, establishing one or, preferably, multiple short-circuiting paths within the circuitry of the radio, for example in the low-power input section, a low-power audio amplifier section, a discriminator or the like; unless the proper code is entered, the short-circuit paths inhibit audio output. If the car radio is of the combination radio-cassette type, interrupting or short-circuiting the audio path before the preamplifier section, permits low-power switching and totally disables the system. When using integrated circuits, it is practically impossible to find the particular short-circuit path. Additional switching, for example of power supplies, may also be made.

The system in accordance with the present invention has the advantage that the radio apparatus, after having been removed from the vehicle, cannot be operated unless the remover knows the appropriate code word. In accordance with a preferred feature of the invention, any user can select his own code word; in accordance with another feature of the invention, the code word could, in turn, trigger a display of a re-encrypted coded display which can be deciphered only by the manufacturer, who, then, will provide the appropriate code word to a customer, provided the customer proves the right to receive the information.

The invention is not limited to electronic equipment, typically audio equipment, installed in automobile radios; of course, other electronic apparatus can be similarly protected, whether installed in automotive vehicles or otherwise positioned.

DRAWINGS

FIG. 1 is a general block diagram illustrating the system of the present invention, and used in connection with an explanation of the method; and FIG. 2 is a fragmentary diagram illustrating a modification of the system of FIG. 1.

DETAILED DESCRIPTION

Figure 1:
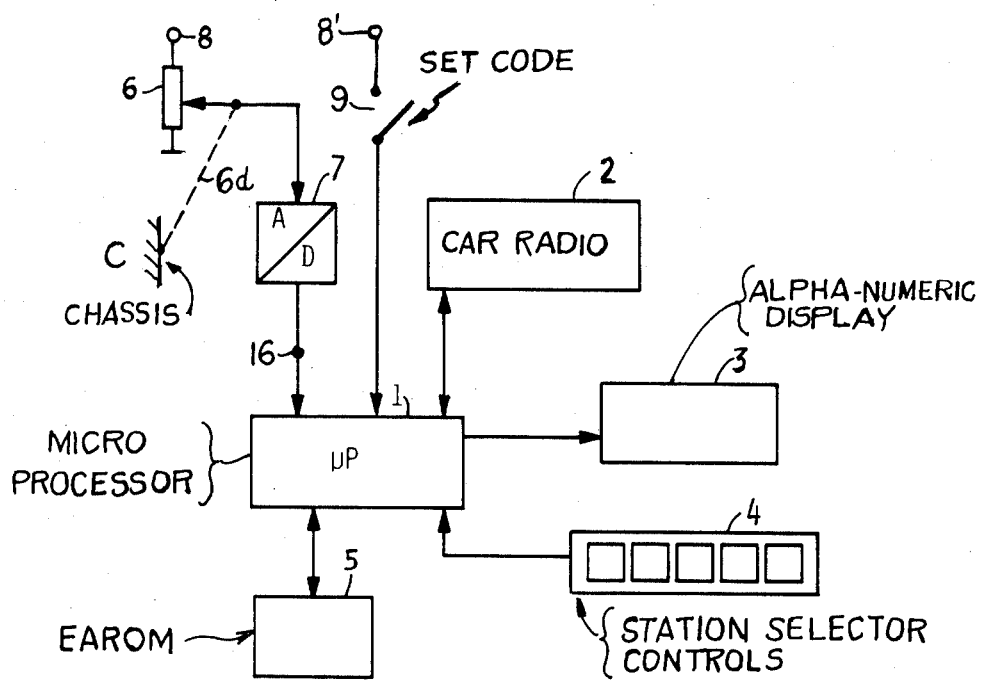

A microprocessor 1 is incorporated as part of a car radio shown, schematically, only in block form. The microprocessor can carry out various functions in the car radio, for example digital tuning thereof. All components not necessary for an understanding of the present invention, and forming part of the car radio, may be considered to be within the block 2. The microprocessor 1 and the components of the car radio 2, of course, are interconnected as shown.

An alphanumeric display 3 is coupled to the microprocessor. The alphanumeric display 3 may, for example, be of the light emitting diode (LED) or of the liquid-crystal display (LCD) type. It may, for example, indicate the then selected station by frequency, and other functions or operating characteristics of the radio which have been commanded, for example if a tape thereof is in an operating or fast-winding mode, indication of time of day, whether the radio is tuned to amplitude or frequency modulation stations (AM, FM) or the like. The operating components, for example pushbuttons or the like, are merely illustrated schematically as a station selection control panel with, for example, five pushbuttons. A non-volatile electrically alterable or erasable memory, that is, an EAROM 5 is coupled to the microprocessor. The station selector controls, of course, are also coupled to the microprocessor.

In accordance with a feature of the invention, a potentiometer 6 having a slider is coupled to a source of electrical voltage 8, for example derived from the car, and the slider of the potentiometer 6 is then coupled through an analog/digital (A/D) converter 7 to the input of the microprocessor 1 through a junction or terminal 16. The slider of the potentiometer 6 is coupled to an elastic reset arrangement which is so designed that, if the radio is removed from a support, for example a well within the dashboard of a car, the potentiometer position of the slider will change. The coupling of the slider to the chassis C of the car is schematically indicated by the broken line 6a, forming a mechanical connection.

Operation: If an unauthorized person removes the car radio, input from the A/D converter 7 to the microprocessor must be controlled to match the input previously supplied which, unless the prior potentiometer position was known, is practically impossible.

Figure 2:
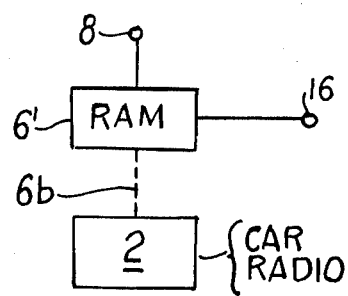

In accordance with another embodiment of the invention, see FIG. 2, the source of voltage 8 is connected through a random access memory (RAM) 6' to the terminal 16 and hence to the microprocessor 1. The RAM 6' is coupled to the car radio 2 as schematically indicated by broken line 6b and, unless energized, for example by receiving power from terminal 8 and hence from the vehicle, will inhibit operation of the car radio. Upon loss of power, as is inherent in an RAM, the data stored therein are lost.

When the radio system of FIG. 1 is first installed in a vehicle, potentiometer 6 is placed in a certain position, given by the position of the radio in the vehicle, resulting in a digital value being entered through the microprocessor 1 in the EAROM 5. Similarly, in the embodiment of FIG. 2, the RAM 6' can be controlled, for example by operation of the pushbuttons 4 and via microprocessor 1, to enter a code number or code word in the EAROM 5. In the embodiment shown in FIG. 1, the slider of the potentiometer 6 will receive a voltage based on its position on the potentiometer, and derived from the source of voltage supply 8, which voltage is converted into a digital value in the A/D converter 7. The digital output signal from the A/D converter 7, or from the RAM 6' (FIG. 2), is then interrogated by the microprocessor 1 and entered in the EAROM 5.

The system is capable of operating in two different modes:

(1) A code word is entered in the EAROM 5 by the manufacturer and, for example, given to the customer in a sealed envelope. In this embodiment, the code word is not provided by the customer. The code word, of course, may be an alphanumeric combination. If the customer forgets the code word and provides the document proving that he is legitimately entitled to receive the information, the manufacturer can then advise the customer of the code word.

(2) The memory 5 has a word entered therein which is the same for all vehicles, for example number 00000 or letters AAAAA. The customer then recodes the memory 5 by entering his own code word. Auxiliary arrangements which permit reconstruction of the customer's code word, in case the customer should forget the code word, are described below.

In the first above-described mode of operation, that is, with a code word entered in the memory 5 by the manufacturer, the customer, upon first utilizing the car radio, places the microprocessor 1 in a "set" or "compare" mode by closing a "set code" switch 9. Switch 9 may be coupled, for example, to a source of operating potential 8'. The customer then can operate the station selector control and, by observing continuously changing numbers on the display 3, enter the code which was notified to the customer by the sealed letter. When the code word entered by the customer, upon operation of switch 9 and with respective operating buttons of the selector controls 4, agree with the code word entered in the memory 5 by the manufacturer, the apparatus can then be used and will be ready for operation unless or until it is removed. At the same time, the value set by the slider of the potentiometer 6, or a memory content, for example entered in RAM 6', is entered into the memory 5. This value may be termed an "apparatus present" code signal which is entered in EAROM 5 in addition to the owner's personal code.

After listening to the radio, and by subsequently re-energizing the radio, the position of the potentiometer 6, or the value in the memory 6' including the "apparatus present" code, is compared with the previously entered values and stored in the memory 5. Upon concurrence, the radio will function properly. Upon non-concurrence, however, the user will receive an output indication on the display 3 requesting the user to enter the code word again. This achieves that normal operation of the car radio is not inhibited, and, in case the car radio was removed by an authorized service station or the like, operation thereof can be resumed by the user at any time. Further, small changes in the position of the potentiometer slider, for example due to vibration, or changes due to aging of the components, can readily be compensated by re-entry of the appropriate code word, stored in memory 5 by the station selector controls 4 and subsequent change of the then pertaining slider position, as digitized in the A/D converter 7, and storage thereof in the memory 5.

If an incorrect code word is entered, the microprocessor 1, by use of an inherent timing circuit, blocks entry of another code word for a few seconds; a further attempt to enter the code word can then be undertaken. The blocking time can increase—for example exponentially, so that obtaining the appropriate code word by trial-and-error is substantially hampered.

In accordance with a further embodiment of the invention, operation of a selected on or more pushbuttons of the station selector control, when the system is in the code checking entry mode—switch 9 closed, for example—causes locking of operation of the radio. Subsequent operation of the radio, thus, requires a new entry of the code. This, for example, may be so done that, in ordinary operation, two selected ones of the buttons 4 are operated, whereupon the microprocessor 1 command erasing of the value stored in the memory 5 for the then pertaining potentiometer setting. At subsequent connection of the radio, microprocessor 1 will recognize a non-concurrence of the actual potentiometer setting with the stored one—remembering that the stored one has been erased—and requires re-entry of the code word. Thus, the user may prevent unauthorized operation of the radio at any time, at the cost of re-entering the code word upon resumption of radio operation.

Second mode, selection of code word by customer: The apparatus is delivered from the manufacturer with a code word which is the same for all systems and thus is listed in the user's instruction. The customer, then, can replace the code word by one specific to the customer; alternatively, the customer can change code words by erasing a previously entered code word and replacing it by a new one. Of course, replacing the code word requires, first, entry of the prior code word, erasing thereof and resetting the memory 5 with a new code word.

In case the operator has forgotten the code word which was selected by the operator, the memory 5 can include an encrypting table. If an incorrect code word is entered in the selector controls, for example after closing switch 9, the display 3 will then provide the encrypted correct code word. The association of the correct code word with the encrypted code word, however, is known only to the manufacturer, who will be the only one who has access to the encrypting table stored in the memory 5. The user, by proving the right to obtain the information, for example by providing to the manufacturer a copy of the bill of sale, title to the vehicle or the like, can then inquire about the correct code word which can be deciphered from the encrypting table.

Under ordinary operation, it is hardly ever necessary to enter the code word; it may become necessary, for example, only upon aging of components, changing of slider position due to vibration or shock, or accident or the like. It is, thus, hardly necessary to provide separate operating or indicating elements for the system. The already existing control buttons and displays in automotive radios can be used also to enter the security codes, or obtain a display thereof. In accordance with a further embodiment of the invention, the already present alphanumerical display showing the frequency of a station to which the radio is tuned, or the like, can serve as the code display. The display 3 as well as the station selector buttons 4 are merely switched over by the microprocessor, for example upon operation of switch 9, when a code word is to be entered if this is necessary as described above.

In accordance with a preferred feature of the invention, five alphanumerical indicia form a suitable code word, providing high reliability against decoding the code by trial-and-error. The number of digits and the selection of the alphanumerical signs increases if alphanumerical indications are used rather than merely numbers.

To enter such a code word using the diplay 3, and, for example, the station selector button 4, with the microprocessor set on "enter code" can be accomplished in this manner:

Upon operation of the first station selector button, the display will, sequentially, provide the number 0 to 9 and then all the letters A to Z—that is, overall, 36 outputs. When the desired number or letter is reached, the button is released, and the number or letter just indicated can be checked on the display and, then, is entered in the microprocessor 1 and hence in the memory 5 in an appropriate address. The second button is then operated, and the steps are repeated until the appropriate alphanumerical code word has been entered.

Various operating components within the microprocessor 1, the display 3, the station selector 4 and the memory 5 are not specifically shown; thus, the microprocessor 1 may include comparison networks, timing circuits, for example to increase the time of entry of a correct code after a wrong code was entered, storing addresses for display of a manufacturer-entered code, and the like. Such elements are not specifically shown in the drawings since they are standard equipment in the components shown, and, largely, may be realized by software or firmware. Likewise, the clock pulses and the scanning of the display by numbers and letters is not specifically shown since any standard and well known circuitry, for example as used in connection with digital clocks, can be used.

Various changes and modifications may be made within the scope of the inventive concept.

The "set" code switch 9 is preferaby identified on the control panel of the radio by a clearly visible indicator button to warn a potential thief that, even if he were to steal the radio, without knowledge of the code, what he would steal would then be inoperative.

We claim:

1. Security system for electronic appartus, particularly car radios, audio systems, or the like, installed on a support (C) therefore, and energized by an external power source (8) associated with the support, comprising memory means (5) for storing a predetermined code word;

code entry means (4,9) for entering the code word into the memory means (5);

means coupled to and energized by the external power source or generating an "apparent present" code upon energization thereof by said external power source (8); means (16,1) for entering the "apparatus present" code in the memory means (5);

removal sensing means (6,7,6') for electrically sensing removal of the electronic apparatus from the support (C) and deenergization of said "apparatus present" code generating means, said removal sensing means including a random access memory (RAM (6') receiving operating voltage from said source (8) which, upon removal of the apparatus from the support, is interrupted;

and logic means (1) connected to the memory means (5), the code entering means (4), and the removal sensing means (6,7,6') said logic means inhibiting operation of the electronic apparatus (2) after removal from the support and failure to sense the "apparatus present" code, until the code word is again entered into said code entering means and stored in the memory means.

2. System according to claim 1, wherein the electronic apparatus comprises an automobile radio, and the support comprises a portion (C) of the chassis of the automobile, said automobile radio having an alphanumerical display (3) and control elements (4) coupled to the radio which, upon operation thereof, causes the display (3) to indicate a function selected by a control element;

and wherein the code entering means (1, 4; 6, 6') for entering the code words into the memory comprises said control buttons, the function of which is displayed by said display.

3. System according to claim 2, wherein the control elements are station selector control elements of the car radio.

4. System according to claim 2, wherein the display, upon operation of a control element, displays, sequentially, a set of alphanumerical indicia;

said logic means sensing operation of a selected control element and, upon change in state of the control element when a specific alphanumerical indicium is displayed, entering a representative datum in the memory, said datum forming part of the code word.

5. System according to claim 1, wherein a display (3) is provided; and said memory (5) includes a storage field for encrypting a selected code word and, after entry of an incorrect code word, the display (3) displays the encrypted code word.

6. System according to claim 1, wherein the logic means includes a timing arrangement which inhibits operation of the apparatus for a predetermined time period after entry of an incorrect code word.

7. System according to claim 6, wherein, upon sequential entry of incorrect code words, the inhibiting time for the apparatus increases.

8. Security system for electronic apparatus, particularly car radios, audio systems, or the like, installed on a support (C) therefor, and energized by an external power source (8) associated with the support, comprising memory means (5) for storing a predetermined code word;

code entry means (4,9) for entering the code word into the memory means (5);

means coupled to and energized by the external power source for generating an "apparatus present" code upon energization thereof by said external power source (8); means (16,1) for entering the "apparatus present" code in the memory means (5);

removal sensing means (6,7,6') for electrically sensing removal of the electronic apparatus from the support (C) and deenergization of said "apparatus present" code generating means, said removal sensing means including a potentiometer (6) coupled to the support (C) and providing the "apparatus present" signal representative of a set position of the potentiometer when the apparatus is located in the support, said potentiometer changing setting upon removal of the electronic apparatus from the support;

means (7,1,5) comparing the potentiometer setting upon reenergization of the electronic apparatus with a set position previously stored in the memory means (5);

and logic means (1) connected to the memory means (5), the code entering means (4), and the removal sensing means (6,7,6') said logic means inhibiting operation of the electronic apparatus (2) after removal from the support and failure to sense the "apparatus present" code, until the code word is again entered into said code entering means and stored in the memory means.

9. System according to claim 8, wherein the electronic apparatus comprises an automobile radio, and the support comprises a portion (C) of the chassis of the automobile, said automobile radio having an alphanumerical display (3) and control elements (4) coupled to the radio which, upon operation thereof, causes the display (3) to indicate a function selected by a control element.

10. System according to claim 9, wherein the display, upon operation of a control element, displays, sequentially, a set of alphanumerical indicia;

said logic means sensing operation of a selected control element and, upon change in state of the control element when a specific alphanumerical indicium is displayed, entering a representative datum in the memory, said datum forming part of the code word.

11. System according to claim 8, wherein a display (3) is provided; and said memory (5) includes a storage field for encrypting a selected code word and, after entry of an incorrect code word, the display (3) displays the encrypted code word.

12. System according to claim 8, wherein the logic means includes a timing arrangement which inhibits operation of the apparatus for a predetermined time period after entry of an incorrect code word.

13. System according to claim 12, wherein, upon sequential entry of incorrect code words, the inhibiting time for the apparatus increases.

14. Security system for electronic apparatus, particularly car radios, audio systems, or the like, installed on a support (C) therefor, and energized by an external power source (8) associated with the support, comprising memory means (5) for storing a predetermined code word; the memory means (5);

means coupled to and energized by the external power source for generating an "apparatus present" code upon energization thereof by said external power source (8);

means (16,1) for entering the "apparatus present" code in the memory means (5);

removal sensing means (6,7,6') for electrically sensing removal of the electronic apparatus from the support (C) and deenergization of said "apparatus present" code generating means, and logic means (1) connected to the memory means (5), the code entering means (4), and the removal sensing means (6,7,6') said logic means inhibiting operation of the electronic apparatus (2) after removal from the support and failure to sense the "apparatus present" code, until the code word is again entered into said code entering means and stored in the memory means, wherein the logic means includes a timing arrangement which inhibits operation of the apparatus for a predetermined time period after entry of an incorrect code word.

15. System according to claim 14, wherein, upon sequential entry of incorrect code words, the inhibting time for the apparatus increases.

16. Security system for electronic apparatus consisting of car audio equipment, particularly car radios, radio—cassette recorder combinations, citizen band radios, and the like, said electronic apparatus being intalled in an automotive vehicle having a battery forming a power source, said vehicle further providing a support (C) for said apparatus, said security system comprising memory means (5) for storing a predetermined code word;

code entry means (4,9) for entering the code word into the memory means (5);

means coupled to and energized by the external power source for generating an "apparatus present" code upon energization thereof by said external power source (8);

means (16,1) for entering the "apparatus present" code in the memory means (5);

removal sensing means (6,7,6') for electrically sensing removal of the electronic apparatus from the support (C) and deenergization of said "apparatus present" code generating means;

and logic means (1) connected to the memory means (5), the code entering means (4), and the removal sensing means (6,7,6'), said logic means inhibiting operation of the electronic apparatus (2) after removal from the support and failure to sense the "apparatus present" code, until the code word is again entered into said code entering means and stored in the memory means;

wherein the logic means includes a timing arrangement which inhibits operation of the apparatus for a predetermined time period after entry of an incorrect code word.

17. System according to claim 16, wherein, upon sequential entry of incorrect code words, the inhibiting time for the apparatus increases.

18. Security system for electronic apparatus consisting of car audio equipment, particularly car radios, radio—cassette recorder combinations, citizen band radios, and the like, said electronic apparatus being installed in an automotive vehicle having a battery forming a power source, said vehicle further providing a support (C) for said apparatus, said security system comprising memory means (5) for storing a predetermined code word;

code entry means (4,9) for entering the code word into the memory means (5);

means coupled to and energized by the external power source for generating an "apparatus present" code upon energization thereof by said external power source (8);

means (16,1) for entering the "apparatus present" code in the memory means (5);

said removal sensing means including a random access memory (RAM) (6') receiving operating voltage from said source (8) which, upon removal of the apparatus from the support, is interrupted.

and logic means (1) connected to the memory means (5), the code entering means (4), and the removal sensing means (6,7,6'), said logic inhibiting operation of the electronic apparatus (2) after removal from the support and failure to sense the "apparatus present" code, until the code word is again entered into said code entering means and stored in the memory means.

19. System according to claim 18, wherein the car radio comprises an alphanumerical display (3) and control elements or buttons (4) to control the radio, said display displaying, in alphanumerical form, a representation of the selected function;

and wherein the code entering means (4) comprises the control elements or buttons (4).

20. System according to claim 19, wherein the control elements are station selector control elements of the car radio.

21. System according to claim 20, wherein said memory (5) includes a storage field for encrypting a selected code word and, after entry of an incorrect code word, the display (3) displays the encrypted code word.

22. System according to claim 19, wherein the display, upon operation of a control element, displays, sequentially, a set of alphanumerical indicia;

said logic means sensing operation of a selected control element and, upon change in state of the control element when a specific alphanumerical indicium is displayed, entering a representative datum in the memory, said datum forming part of the code word.

23. System according to claim 18, wherein the logic means includes a timing arrangement which inhibits operation of the apparatus for a predetermined time period after entry of an incorrect code word.

* * * * *